United States Patent

Nishikawa et al.

[11] Patent Number: 6,008,930
[45] Date of Patent: Dec. 28, 1999

[54] ACOUSTOOPTICAL MODULATOR

[75] Inventors: Tomoyuki Nishikawa; Hideaki Asaoka, both of Tokyo, Japan

[73] Assignee: Ando Electric Co., Ltd., Tokyo, Japan

[21] Appl. No.: 09/034,824

[22] Filed: Mar. 4, 1998

[30] Foreign Application Priority Data

Mar. 4, 1997 [JP] Japan ..................... 9-049484

[51] Int. Cl.$^6$ ..................................... G02F 1/11
[52] U.S. Cl. .......................................... 359/285
[58] Field of Search .................. 359/285, 305, 359/326, 310, 313, 314

[56] References Cited

U.S. PATENT DOCUMENTS

| | | | |
|---|---|---|---|
| 4,330,178 | 5/1982 | McNaney | 350/358 |
| 4,440,472 | 4/1984 | Cohen | 350/162.12 |
| 5,107,368 | 4/1992 | Noguchi | 359/285 |

FOREIGN PATENT DOCUMENTS

| | | |
|---|---|---|
| 24 53 233 | 5/1976 | Germany . |
| 63-307434 | 12/1988 | Japan . |
| 1-216316 | 8/1989 | Japan . |

*Primary Examiner*—Georgia Epps
*Assistant Examiner*—Suzanne Letendre
*Attorney, Agent, or Firm*—Fish & Richardson P.C.

[57] ABSTRACT

The object of the present invention is to present an acoustooptical modulator without ripples in its wavelength loss characteristics. In order to achieve this objective, the present invention provides an acoustooptical body 8 having a piezo-electric vibrator supplying, for example, ultrasonic vibration, to modulate the incident optical signal, an acoustooptical medium rotated 90° on the crystal axis of the acoustooptical medium upon which the optical signal emitted from acoustooptical medium is incident, and eliminates the polarization mode scattering caused the birefringence of both acoustooptical medium and acoustooptical medium.

4 Claims, 3 Drawing Sheets

ACOUSTOOPTICAL MODULATOR

BACKGROUND OF THE INVENTION

1. Field of the Invention

The present invention relates to an acoustooptical modulator, such as those used in optical measuring devices.

2. Background Art

An acoustooptical modulator adds a modulation signal to a piezoelectric element, and causes periodic oscillation in the refractive index within an optical medium by ultrasonic waves produced therein, modulating the beam.

FIG. 4 is a block diagram showing an example of the arrangement of the conventional technology for an acoustooptical modulator.

In the arrangement shown in FIG. 4, the optical signal propagated by an optical fiber 51 is focused by a lens 52 and is incident on the acoustooptical modulator 58.

The ultrasonic band frequency signal produced by the oscillator 53 is incident on the piezoelectric vibrator 54 installed on the acoustooptical medium 58, and the ultrasonic waves produced by this piezoelectric vibrator cause periodic oscillation of the refractive index of the acoustooptical medium 58.

At this point, the optical signal incident from the optical fiber 51 is separated into the transmitted beam and the primary diffracted beam due to a diffraction grating being formed in the acoustooptical medium 58.

The optical signal output from this acoustooptical modulator transits a prism 55, and after being focused by a lens 56, is emitted by the optical fiber 57.

By switching the signal output by the above described oscillator 53 on and off, the diffracted photons within the acoustooptical medium are generated and extinguished. Due to this, in addition to use as an optical modulator, the arrangement shown in FIG. 4 realizes a mechanism for switching on and off an optical signal transiting between the optical fiber 51 and the optical fiber 57, and is widely used as, for example, a measuring device.

However, when using the acoustooptical modulator as a measuring device, loss due to the wavelength dependence of the acoustooptical modulator becomes a problem. FIG. 5 is a chart showing the wavelength-dependent characteristics of the loss of the acoustooptical modulator shown in FIG. 4.

As is apparent from FIG. 5, when the wavelength of the optical signal transiting within the acoustooptical modulator changes, ripple characteristics can be observed in the wavelength loss characteristics. This is believed to be due to polarization mode scattering produced by birefringence characteristics of the acoustooptical medium.

That is, when an optical signal having polarization mode scattering transiting the acoustooptical modulator enters the emitting optical fiber, inside optical fiber 57, interference due to the effects of mixing inside the optical fiber 57 is produced. In this case, the degree of interference changes depending on the wavelength of the optical signal.

Because of this, when the wavelength of the optical signal transiting inside the acoustooptical modulator changes, even if the power of the entering optical signal is constant, the power at the end of optical fiber 57 fluctuates. This is the ripple of the loss characteristics of the acoustooptical modulator.

The ripples having these loss characteristics become a significant problem when using this acoustooptical modulator as, for example, a measuring apparatus.

SUMMARY OF THE INVENTION

In consideration of this, it is an object of the present invention to provide an acoustooptical modulator that eliminate ripples in the wavelength loss characteristics.

In order to achieve this object, the present invention comprises a first acoustooptical medium upon which an optical signal from a first optical fiber is incident, and through which the optical signal transits; a vibrator mounted on a surface parallel to the optic axis of the optical signal in the first acoustooptical medium; and an oscillator that supplies a modulated signal to the vibrator; and in an acoustooptical modulator that emits the optical signal though a second optical fiber, a second acoustooptical medium mounted along the optic axis between the first optical fiber and the second optical fiber, which has an identical material and identical optical path length as the first acoustooptical modulator, and is disposed rotated 90° with respect to the direction of the crystal axis of the first acoustooptical medium.

According to the present invention, the first acoustooptical medium having a vibrator for providing ultrasonic vibration modulates the incident optical signal, and transmits the incident optical signal to the second acoustooptical medium which is rotated 90° with respect to the direction of the crystal axis of the first acoustooptical medium. Because the polarization mode scattering due to the birefringence of each acoustooptical medium is eliminated, it is possible to realize an acoustooptical modulator with no ripple in the wavelength loss characteristics.

In addition, the present invention may have first and second acoustooptical media which are rectangular parallelepipeds having an incident surface orthogonal to the optic axis of the optical signal.

Finally, the present invention may be provided with a prism that alters the direction of the progress of the optical signal between the second acoustooptical medium and the second optical fiber.

DETAILED DESCRIPTION OF THE PREFERRED EMBODIMENTS

Figure 1:
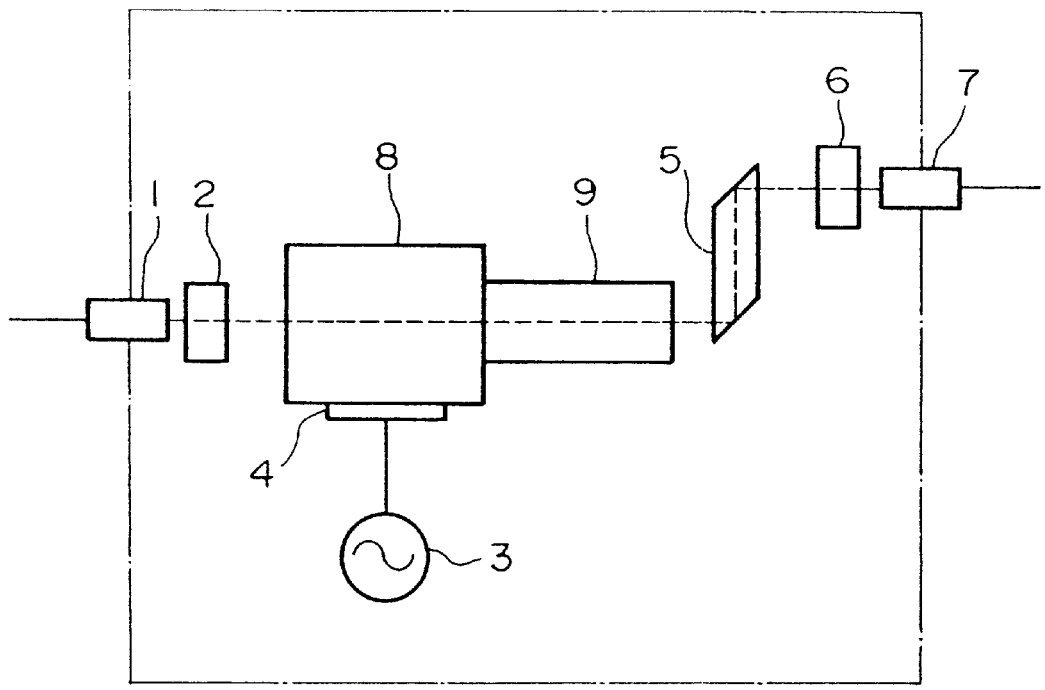
FIG. 1 shows a structural diagram of the acoustooptical modulator according to the first embodiment of the present invention.

Below is an explanation of the present embodiment. FIG. 1 is a structural diagram showing the arrangement of the acoustooptical modulator of an embodiment of the present invention.

In FIG. 1, reference numeral 1 is an optical fiber supplying an optical signal to the acoustooptical modulator of the present invention. Reference numeral 2 is a lens that focuses the supplied optical signal.

Reference numeral 8 is acoustooptical medium, and the optical signal focused by the lens 2 is incident thereon. A piezoelectric vibrator is disposed on this acoustooptical medium 8.

Reference numeral 3 is an oscillator producing a modulated signal supplied to the piezoelectric vibrator 4 disposed on the acoustooptical medium 8.

Figure 2:
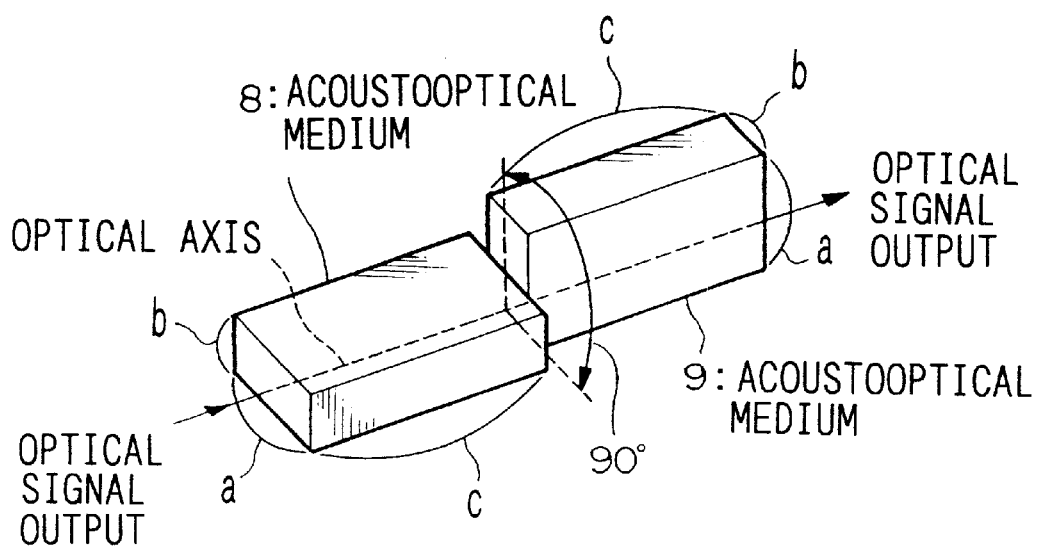
FIG. 2 is a cross-section diagram showing the relationship between the positions of the acoustooptical medium 8 and the acoustooptical medium 9 in the same embodiment.

At the emitting end of the acoustooptical medium (on the right side of FIG. 1), another acoustooptical medium is disposed. FIG. 2 is a cross-sectional diagram showing the relationship of the positions of the acoustooptical medium 8 and the acoustooptical medium 9. The second acoustooptical medium 9 can be placed in contact with the first acoustooptical medium 8.

As shown in the figure, the acoustooptical medium 8 and the acoustooptical medium 9 in the present embodiment are of identical material and both have the form of a rectangular parallelepiped. The lengths of the edges a, b, and c of acoustooptical medium 8 and acoustooptical medium 9 are identical.

The direction of edges a and b of acoustooptical medium 8 and acoustooptical medium 9 are mutually rotated 90° with respect to the center of the optic axis. That is, with respect to acoustooptical medium 8, acoustooptical medium 9 is rotated 90° on the direction of the crystal axis.

As is shown in FIG. 1, in acoustooptical medium 8 and acoustooptical medium 9, a cyclic modulation of the refractive index is produced inside the acoustooptical medium 8 by ultrasonic waves when a modulated signal is supplied by piezoelectric vibrator 4 from oscillator 3, and a diffraction grating is formed.

At this point, the optical signal supplied to the acoustooptical modulator of the present embodiment by the optical fiber is focused by the lens 2 incident on the acoustooptical medium 8. The optical signal which has entered acoustooptical medium 8 is diffracted by the diffraction grating formed therein, and separated into the transiting beam and the primary diffraction beam. Moreover, the optical signal which has transited the acoustooptical medium 8 is subject to polarization mode scattering because of the birefringence of the acoustooptical medium 9.

The optical signal emitted from the acoustooptical medium 8 is next incident on the acoustico-optic medium 9. As described above, the acoustooptical medium 8 and the acoustooptical medium 9 are mutually rotated 90° with respect to their optic. Due to this, the polarization mode scattering produced in transiting acoustooptical medium 8 is cancelled in transiting acoustooptical medium 9.

Thus, the optical signal that has transited acoustooptical medium 9 passes through prism 5, is focused by lens 6, and subsequently is emitted from the acoustooptical modulator from the emitting end of optical fiber 7.

Figure 3:
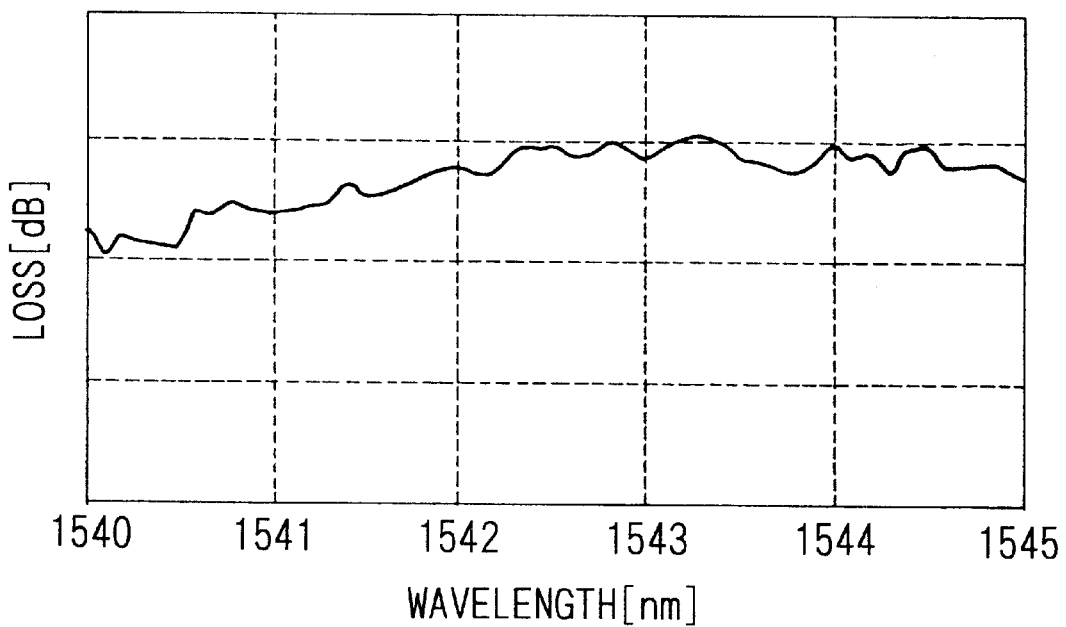
FIG. 3 is a diagram showing the wavelength loss characteristics of the acoustooptical modulator in the same embodiment.
Figure 4:
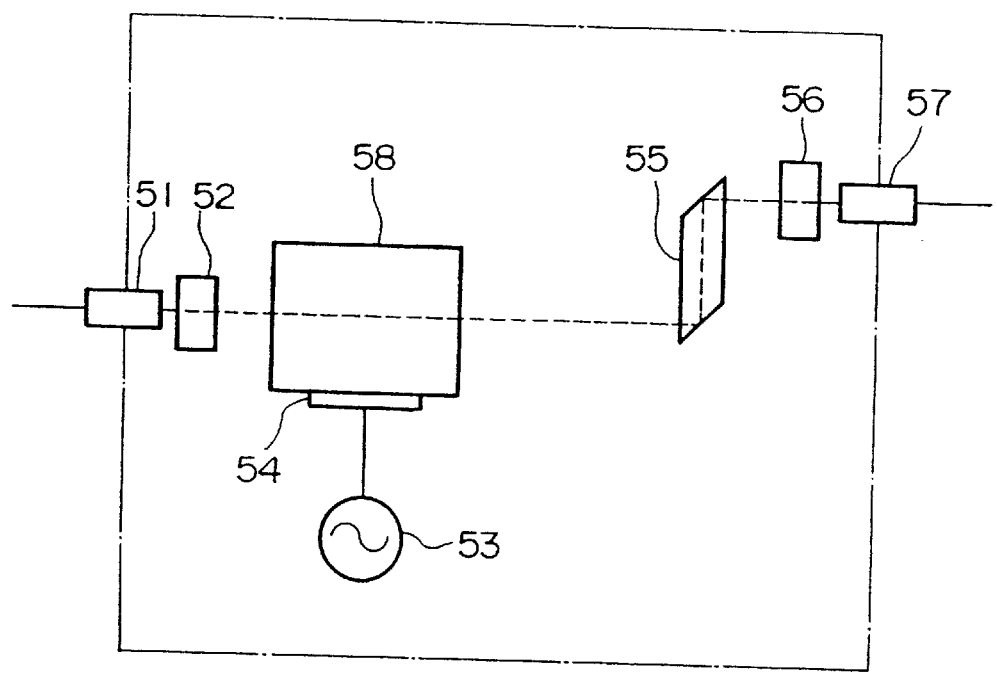
FIG. 4 is a block diagram showing a conventional acoustooptical modulator.
Figure 5:
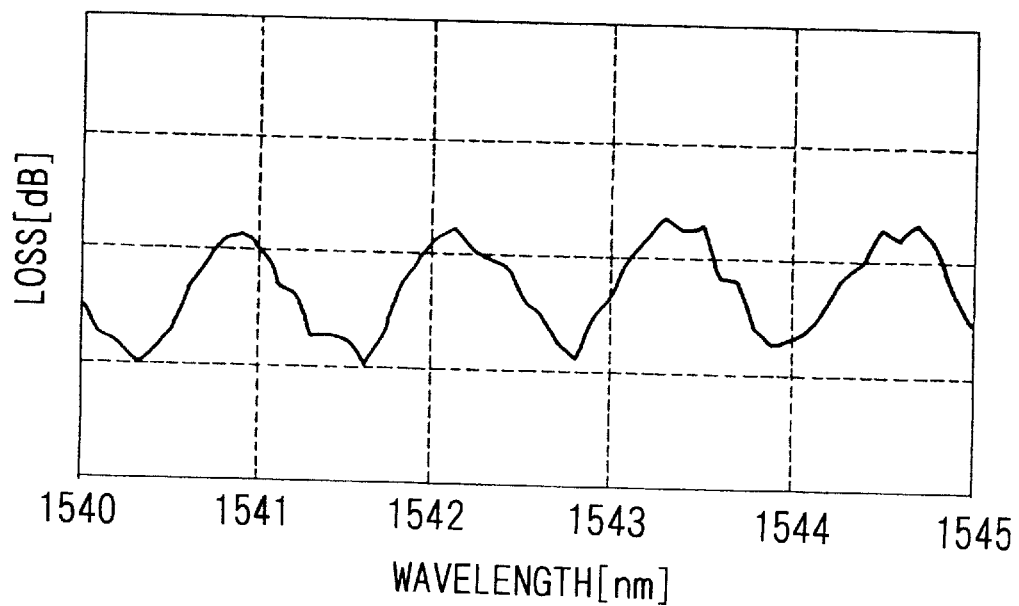
FIG. 5 is a diagram showing the wavelength loss characteristics of the acoustooptical modulator shown in FIG. 4.

FIG. 3 is a diagram showing the wavelength loss characteristics of the acoustooptical modulator according to the present embodiment. In such an embodiment, even when there is a change in the wavelength of the optical signal, a beam without ripple characteristics is obtained.

Moreover, in the above described embodiment, acoustooptical media 8 and 9 were rectangular parallelepipeds, but additionally, any form having an incident surface nearly orthogonal to the optic axis of the transiting optical signal, for example, a cylindrical column, is suitable.

Additionally, in the above-described embodiment, an example of a structure wherein an acoustooptical medium 9 was interposed between acoustooptical medium 8 on the optic axis was explained. However, the present invention can be structured so that if the direction of the crystal axis of the acoustooptical medium 9 is rotated 90° with respect to the acoustooptical medium 8, the acoustooptical medium 9 can be interposed between acoustooptical medium 8 and lens 2 on the optic axis.

Finally, either the transiting beam or the primary diffracted beam of the optical signal that is emitted from the acoustooptical medium 8 can be used in the present invention.

What is claimed is:

1. An acoustooptical modulator, for modulating an optical signal outputted from a first optical fiber and for outputting a modulated optical signal to a second optical fiber, comprising:

a first acoustooptical medium, mounted along an axis of the optical signal, upon which the optical signal is incident, and through which said optical signal transits;

a vibrator mounted on a surface parallel to the optical axis of said optical signal in said first acoustooptical medium;

an oscillator means supplying a modulating signal to said vibrator;

a second acoustooptical medium mounted along the optical axis of said optical signal and placed in contact with the first acoustooptical medium, the second acoustooptical medium having identical material and identical optical path length as said first acoustooptical medium, and rotated 90° in the direction of a crystal axis with respect to said first acoustooptical medium;

wherein the optical signal transits through said first acoustooptical medium and said second acoustooptical medium along said optical axis, said vibrator vibrating said first acoustooptical medium, the optical signal being modulated thereby.

2. An acoustooptical modulator according to claim 1, wherein said first and second acoustooptical media have incident surfaces orthogonal to the optical axis of said optical signal.

3. An acoustooptical modulator according to claim 1, further comprising a prism for altering the direction of said modulated optical signal between said second acoustooptical medium and said second optical fiber.

4. An acoustooptical modulator according to claim 3, further comprising a lens for focusing the modulated optical signal transiting said prism to said second optical fiber.

* * * * *